United States Patent Office 3,553,766
Patented Jan. 12, 1971

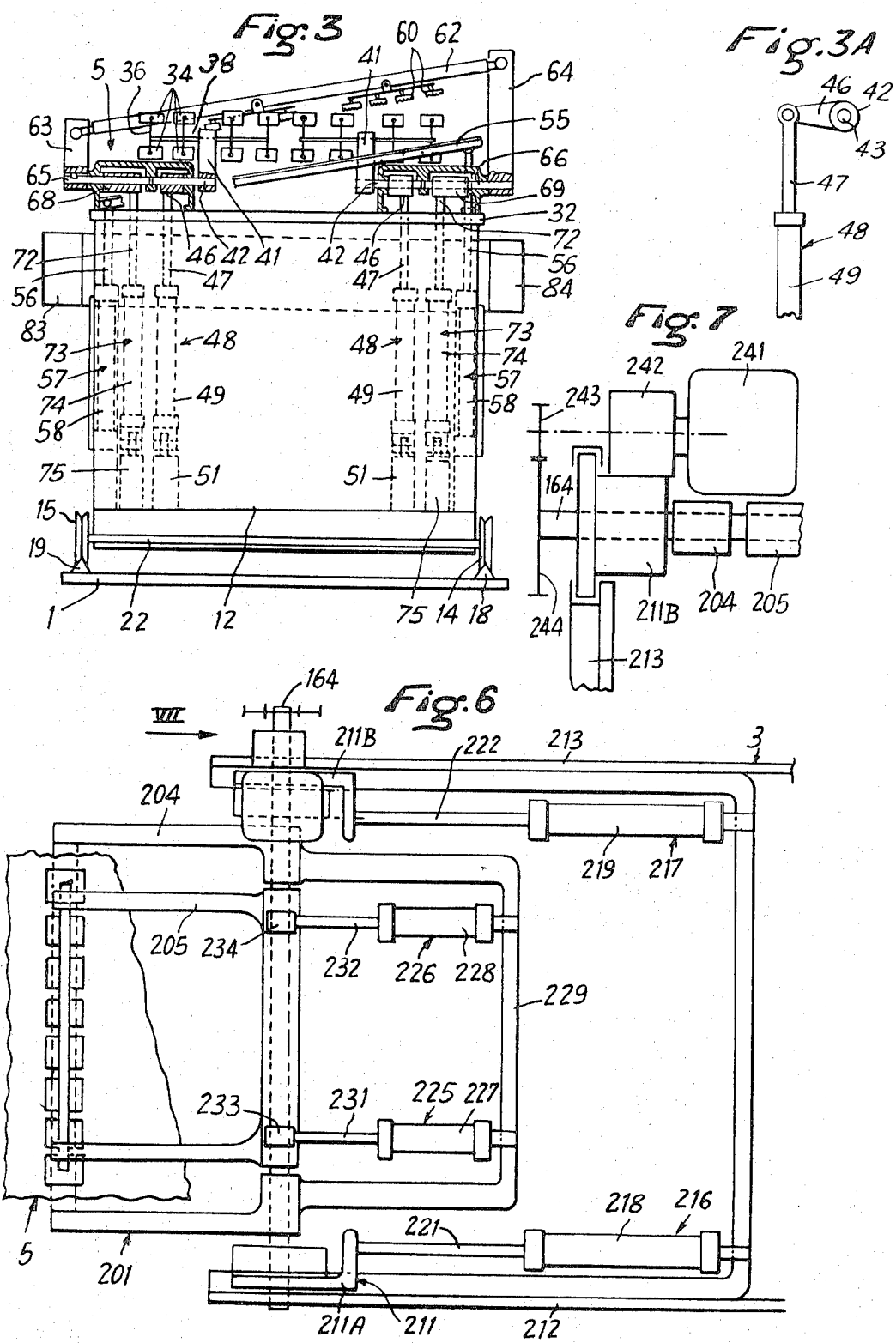

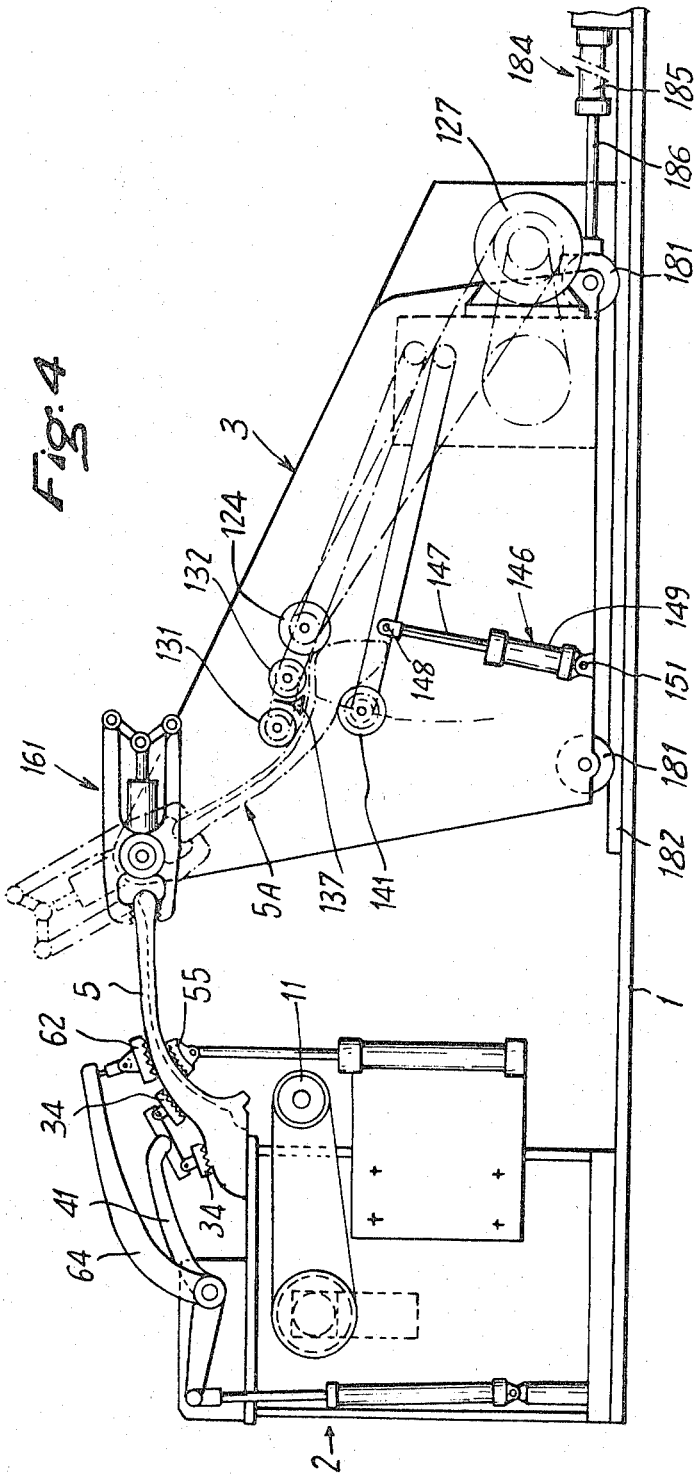

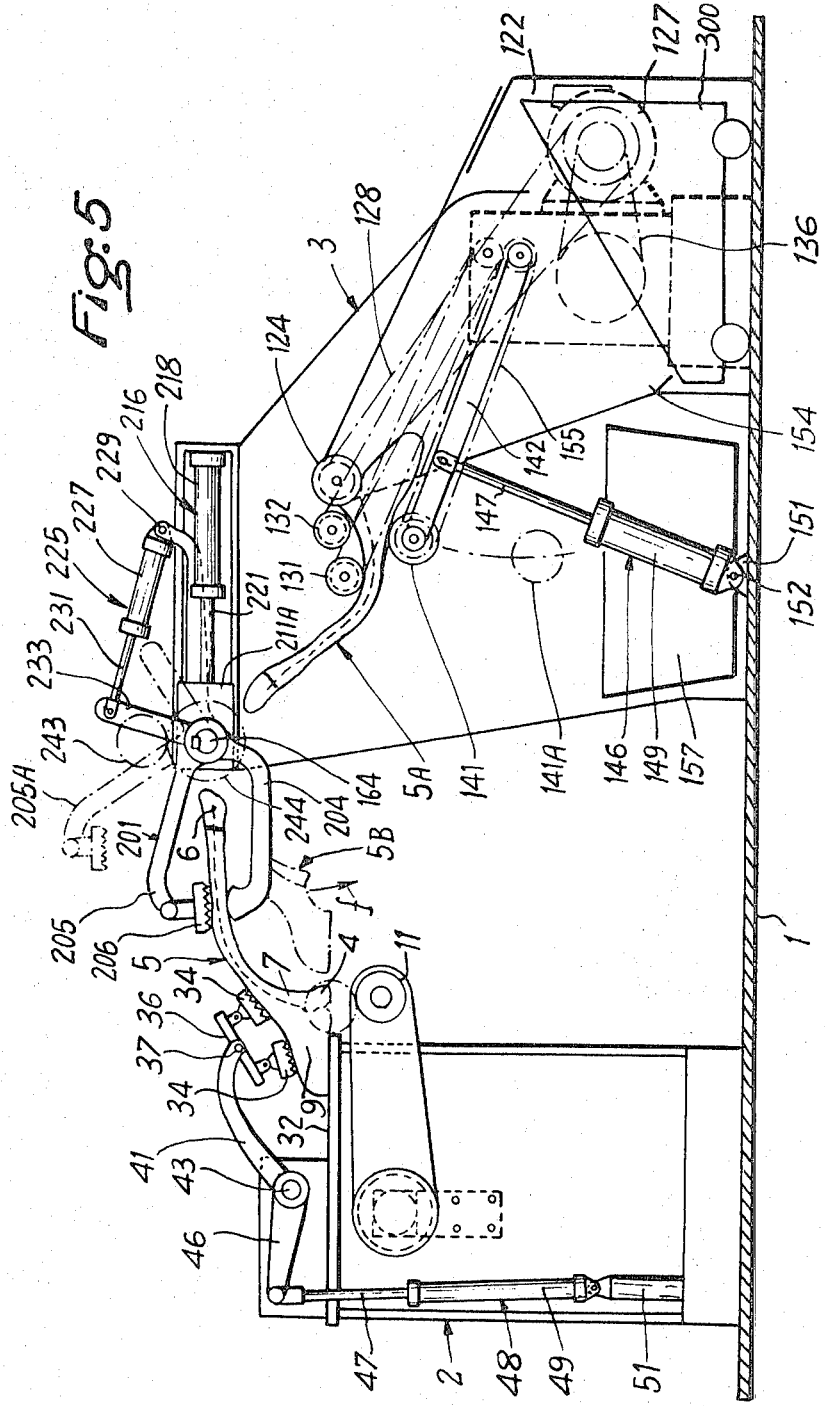

3,553,766
MACHINE FOR BONING FOREQUARTERS OF MEAT
Jean-Frederic Herubel, Guebwiller, France, assignor to N. Schlumberger & Cie, Guebwiller, Haut-Rhin, France
Filed Feb. 19, 1969, Ser. No. 800,403
Int. Cl. A22c *17/04*
U.S. Cl. 17—1                                              8 Claims

ABSTRACT OF THE DISCLOSURE

A machine for boning forequarters of meat, comprising a first unit with a support table whereon a quarter is laid so that the spinal column overhangs an edge of the table, and a cutter to remove the spinal column. The machine also includes a second unit in which the quarter is inserted between guide and support rollers with the ribs uppermost and moved against a cutter so that the meat is separated from the bones, and a transfer mechanism for removing the quarter from the first unit comprising a pincer which grips the quarter and inserts it into the second unit.

---

This invention concerns machines for boning the forequarters of meat.

Such machines are already known, and comprise a first station with means for supporting a quarter of meat, and a rotary cutter which preferably has also a reciprocating axial movement for removal of the spinal column, and a second station in which the meat is detached from the ribs by means of thin tools which are inserted between the meat and the ribs.

An object of the invention is to provide a machine for boning the forequarters of meat which is of simpler construction and carries out rapid and carefully done work.

For this purpose, the invention provides a machine for boning the forequarters of meat having a first station comprising means for supporting a meat quarter and a rotary cutter for removing the spinal column, the cutter preferably having also a reciprocating axial movement, a second station having a second rotary cutter for removing ribs, means for guiding and advancing the quarter towards this second cutter and conveying means causing the quarter to pass from the first station to the second station.

In one advantageous embodiment, the first station is constituted by a first unit comprising a table for supporting a front quarter of meat with the ribs underneath and the spinal column extending just beyond the rear edge of the table, means for clamping the quarter onto the table and for supporting the ribs beyond the edges of the table, and a cylindrical cutter, preferably having an axial reciprocating movement which is adjustable in height along the rear edge of the table; while the second station is constituted of a second unit comprising a horizontal cylindrical cutter, at least one rotary feed cylinder for guiding and bringing the quarter under the cutter, the ribs extending upwards, and a rotary supporting cylinder adjustable in height and holding the quarter against the feed cylinder.

In one particular embodiment, the conveying means for the quarter are constituted by a support provided with a wide rocking pincer adapted to seize the quarter in the first station to bring it to the cutter at the second station.

The invention will now be more particularly described in the following description with reference to the accompanying drawings, in which:

FIGS. 1A and 1B are, respectively, an elevation and a plan view of a detail of the machine shown in FIG. 1;

FIG. 3 is a side view from the direction of arrow III in FIG. 1;

FIG. 3A is a partial elevation view illustrating a detail of FIG. 3;

FIG. 4 is a side view of a first modified embodiment of the boning machine according to the invention;

FIG. 5 is a side view of a second modified embodiment of the boning machine according to the invention;

FIG. 6 is a partial plan view on an enlarged scale of the machine shown in FIG. 5; and FIG. 7 is a partial side view in the direction of arrow VII in FIG. 6 on a yet larger scale.

Figure 1:
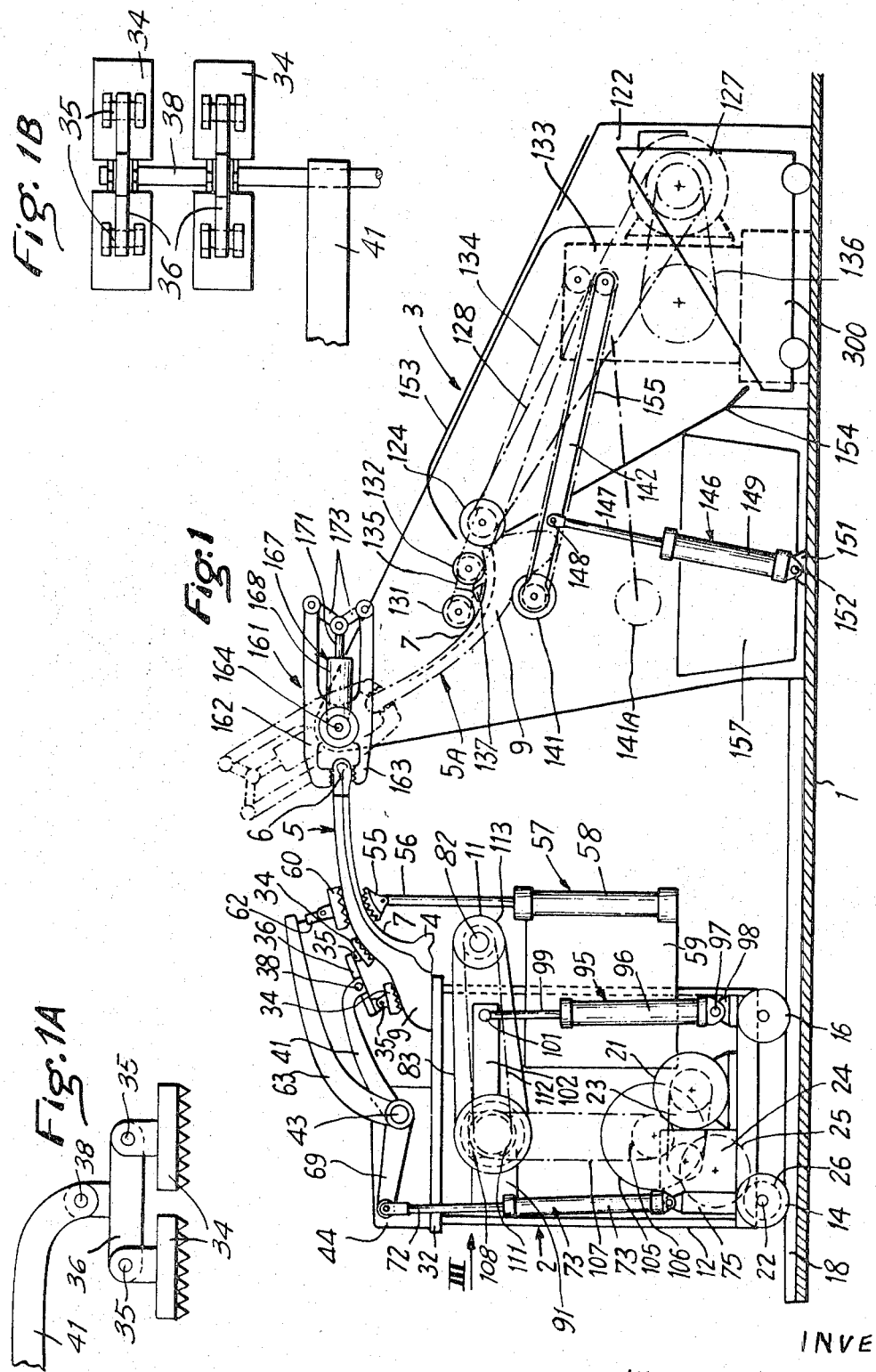
FIG. 1 is a side view of a first embodiment of the boning machine according to the invention.
Figure 2:
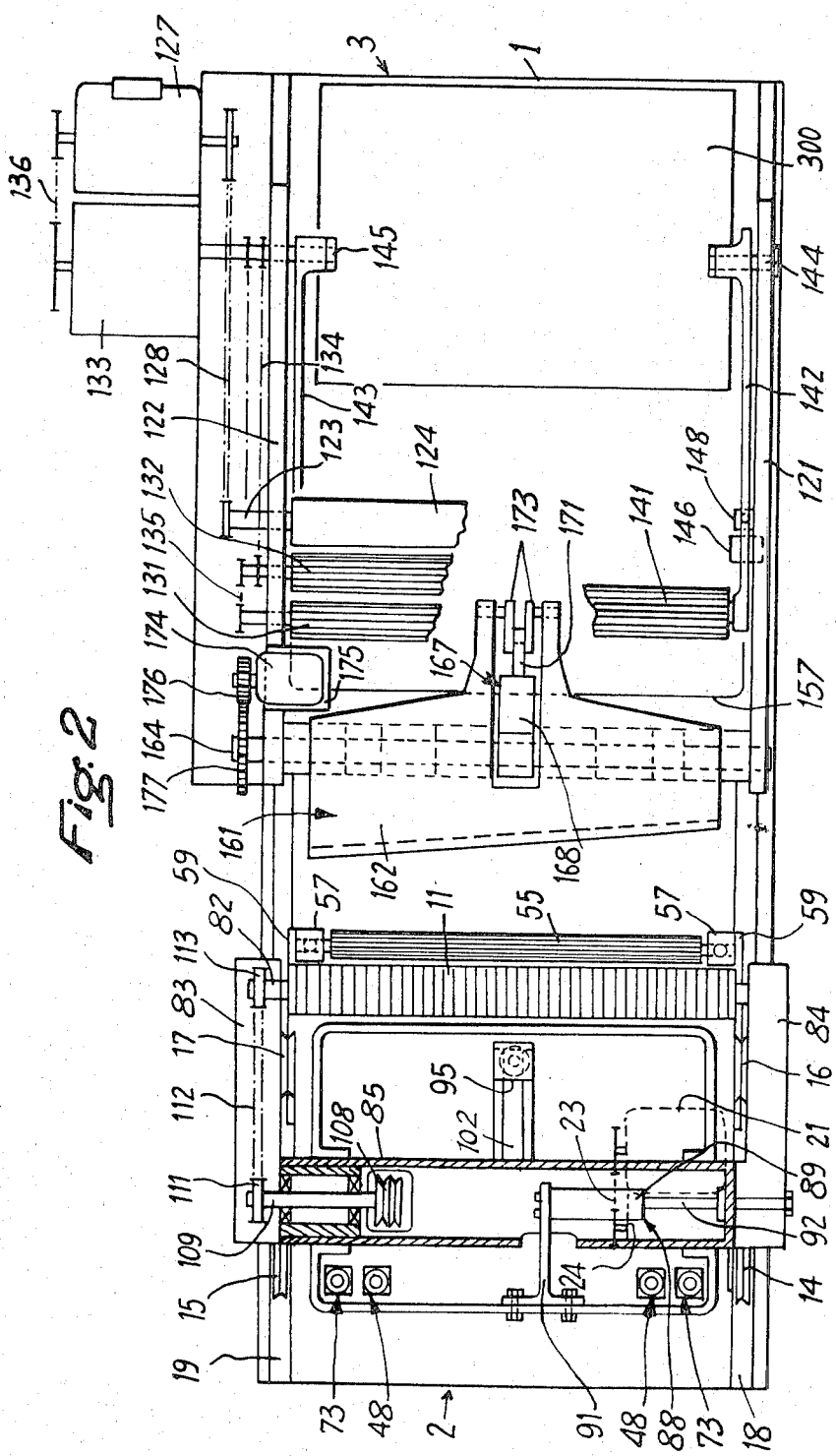
FIG. 2 is a plan view of the machine shown in FIG. 1.

The machine according to the invention, for boning forequarters of meat, shown in FIGS. 1 to 3 has, on a bed plate 1, a first cutting unit for removing the spinal column, general reference 2, and a second cutting unit for removing ribs, general reference 3.

In the following description, the part of the machine referred to as the "front" is the part including the first cutting unit 2.

The cutting unit 2 for removal of the spinal column comprises a rotary cutter 11 with axial reciprocating movement, mounted, as will be described later, on a support frame 12 carried by wheels 14, 15, 16 and 17 which rest on two rails 18, 19 fixed on the upper side of the bed plate 1.

The support frame 12 may be caused to advance on the rails by means of an electric motor 21 carried by the support frame 12 and connected to an axle 22 common to wheels 14 and 15 by means of a transmission, for example, a belt 23, a speed reducer 24 and a toothed wheel 25 carried by the shaft of the speed reducer 24 and engaging with another toothed wheel 26 carried by axle 22. According to whether the electric motor is rotated in one direction or the other, the unit 2 may be brought towards the unit 3 or moved away from it.

The upper part of the support frame 12 forms a table 32 on which may be fastened a quarter of meat 5, with the ribs 7 underneath and the spinal column 4, supported by the ribs, projecting beyond the rear edge of the table, by means of a system of fluted shoes 34, in the present example comprising 8 pairs.

The shoes of a pair are each articulated on a respective pivot 35 one at each end of a small bar 36 pivoted on a large beam 38 (see FIG. 3). The beam 38 is itself articulated on one end of an arm 41 which is integral with a sleeve 42 which is oscillatable on a fixed shaft 43 having its ends in the two supports 44 which are integral with a table 32. The sleeve 42 is integral with an arm 46 which is articulated at an end of the piston rod 47 of a fluid pressure linear actuator 48, the cylinder 49 of which is pivoted on a support 51 fixed in the lower part of the support frame 12. In the example shown, there are two arms 41 each supporting four pairs of fixing shoes 34 and actuated respectively by two respective actuators 48.

For cutting out the spinal column, the quarter of meat 5 is supported additionally by a fluted crosspiece 55 itself supported at its two ends by the piston rods 56 of two fluid pressure linear actuators 57 which have cylinders 58 with their ends fixed to a plate 59. The plates 59 are fixed against the corresponding side faces of the support frame 12. Finally shoes 60 are articulated under a crosspiece 62 situated above the supporting crosspiece 55 (FIG. 3) and is supported at its ends by arms 63, 64 which are integral with sleeves 65, 66, respectively. The sleeves 65, 66 can also turn on the upper horizontal shaft 43 and are integral with two other arms 68, 69 connected to the ends of the piston rods 72 of two fluid pressure linear actuators 73, the cylinders 74 of which are articulated on two stationary supports 75 also fixed in the lower part of the support frame 12. The supporting crosspiece 55 and clamping crosspiece 62 are inclined as shown (FIG. 3) to take into account the general configuration of a quarter of meat.

The rotary cutter 11 with axial reciprocating movement is cylindrical and integral with a shaft 82 whose ends rotate in the free ends of two lateral arms 83, 84 the other ends of which are fixed rigidly on the two ends of a transverse tube 85 which can pivot and slide axially in the upper part of the support frame 12.

The axial sliding movement of the tube 85 is ensured by a fluid pressure linear actuator 88, the cylinder 89 of which is carried by a support 91 fixed to the frame while the end of the piston rod 92 of the actuator is connected to the tube 85. Actuator 88 is fed by a suitable distribution system adapted to impart to its piston, and consequently to the tube 85 and the cutter 11, a to-and-fro axial movement.

The pivoting movement of the tube 85 is effected under the action of a fluid pressure linear actuator 95, the cylinder 96 of which is articulated, by a ball and socket joint 97, in a yoke 98 fixed on the lower part of the frame 12, while the free end of the piston rod 99 of actuator 95 is articulated by a ball and socket joint 101 on the end of an arm 102 integral with the tube 85. By means of the actuator 95, the rotary cutter 11, with axial reciprocating movement, can, therefore, be made to ascend or descend.

This cutter is driven to rotate by an electric motor 105 through a transmission which comprises a pulley 106 fixed to the shaft of the motor 105, a belt 107 which passes over the pulley, a second pulley 108 rotatable integrally with a longitudinal shaft 109 rotatable inside the tube 85 coaxially with this latter, the belt 107 also passing over this pulley 108 through an opening tin the tube 85, another pulley 111 fixed on one end of the shaft 109 inside the arm 83 which, for this purpose, is hollow in the embodiment shown, and finally a belt 112 passing over the pulley 111 and over another pulley 113 secured to the shaft 82 of the cutter 11.

This belt transmission could of course be replaced by any other suitable transmission.

The other unit 3 for cutting the ribs (FIGS. 1 and 2) comprises a frame constituted by two plates 121, 122 fixed on the bed plate 1 and in which are rotatably mounted the ends of a shaft 123, on which is fixed the cylindrical cutter 124 for removing the ribs. The cutter carrying shaft is driven in rotation from an electric motor 127 by means of a chain or belt transmission 128.

Between the two plates 121, 122, there are rotatably mounted two feed cylinders 131, 132 driven from electric motor 127 by means of a transmission 136, a speed reducer 133 and two chains or belts 134, 135. These two feed cylinders position the quarter of meat with respect to the cutter as they drive it towards the cutter 124. Between the two feed cylinders 131, 132, there is also located a fixed guide 137 (FIG. 1) adapted to perfect the positioning of the meat, in particular when it has left the feed cylinder 131.

A pressure cylinder 141 co-operates with the two feed cylinders 131, 132 and is rotatably mounted by its two ends, in arms 142, 143 which pivot respectively in plates 121, 122 by means of axles 144, 145. The pressure cylinder 141 can be moved up under the action of two fluid pressure linear actuators such as 146, each having a piston rod 147 which is articulated by an axle 148 on the corresponding arm 142 or 143, and a cylinder 149 which is articulated by an axle 152 on a yoke 151 fixed on the bed plate 1. The pressure cylinder 141 is also rotated by a chain or belt 155 from the speed reducer 133 (FIG. 1).

The removal of bone chippings and bone powder produced by the rotating cutter 124 is effected by deflectors 153, 154 fixed on the two plates 121, 122 and which lead into a collecting receptacle 300 disposed at the rear end of the machine between the said plates 121, 122.

The boned meat quarters fall into a container 157 which is located below the cutter 124. This container may be replaced by any other suitable means for the removal of the boned meat quarters.

Finally, the upper part of the unit 3 is provided with a pivoting pincer or grab 161 composed essentially of two jaws 162, 163 carried by a shaft 164 which pivots in the upper part of the plates 121, 122.

One of the two jaws is secured to the shaft 164 and the other can pivot freely thereon. The closing and opening movements of the grab 164 are ensured by a fluid pressure linear actuator 167, the cylinder 168 of which is articulated freely on the shaft 164 while the piston rod 171 is connected by the two links 173 to respective extensions of the two jaws 162, 163.

The oscillating movement of the shaft 164, which carries the pincer 161 for turning the quarter of meat 5, is ensured by a reversible electric brake motor 174 (FIG. 2) carried by a support 175 fixed to the plate 122. The motor is connected to the shaft 164 by a suitable transmission shown schematically by two meshing toother wheels 176, 177.

The machine works as follows:

The cutting unit 2 for removing the spinal column being in the working position shown in the drawings, that is, close to the unit 3, the cutter 11 in the lower position by retraction of actuator 95, the fluted crosspiece 55 for supporting the ribs in the upper position by extending the actuators 57 and inclined with respect to the horizontal as shown in FIG. 3, the shoes 34 and the crosspiece 62 being raised by retracting actuators 48 and 73, respectively, and the jaws 162, 163 of the grab 161 being opened by retraction of actuator 167, a forequarter of meat 5 is placed on the table 32 so that the spinal column 4 is substantially parallel to the rear edge of the table 32 and above the rotary cutter 11 while the ribs 7 are supported by the crosspiece 55. The edge of the quarters which comprises the ends of the ribs or the breast 6 is engaged between the jaws of the grab or pincer 161. The shoes 34 and the fixing crosspiece 62 are brought down into the position of abutment on the quarter and the jaws of grab 161 are closed by extending actuator 167. The quarter of meat is thus solidly held in place in the machine. The motor 105 for rotating the cutter 11 is started, and the cutter 11 moved up by extending the actuator 95 so that it comes into contact with the spinal column 4 which it removes and, at the same time disconnects the ribs from one another.

After removal of the spinal column, the cutter 11 is brought down into the retracted position by drawing in the actuator 95. While keeping the pincer or grab 161 closed, the remainder of the quarter is released by raising the shoes 34 and the clamping crosspiece 62 and the crosspiece 55 is also retracted downwards.

At the same time the unit 2 is moved away from the unit 3, the grab 161 is rocked by pivoting its supporting shaft 164 so that the quarter of meat passes from the position shown in full lines at 5 in FIG. 1 to the position shown in broken lines at 5A in the figure.

The pressure cylinder 141 having been previously brought downwards into position 141A by drawing in actuators 146, is now again brought up against the meat quarter which it applies by the ribs, now on top, against the two feed cylinders 131, 132 and the intermediate guide 137. The motor 127 for driving the cutter 124 and the feed and pressure cylinders is started so that the ribs are positioned with precision with respect to the cutter 124 and at the same time the grab 161 is opened so as to permit the meat quarter 5A to be driven progressively against the cutter 124 which removes the ribs by cutting while the meat 9 falls by its own weight into container 157.

When the meat quarter is practically completely boned, that is to say, when the breast 6 arrives level with the feed cylinders 131, 132, the cutting operation is stopped. The pressure cylinder 141 is brought back to its lower position 141A and the boned quarter is recovered.

If the breast has been previously removed, the operation stops only when the ribs are completely passed in front of the cutter 124 and the meat has fallen into the container 157.

It will be noted first of all that, due to the presence of the feed cylinders 131, 132 and the fixed intermediate guide 137, the quarter is always best positioned in front of the cutter 124, which allows carrying out precision work as far as the end of the ribs and consequently very cleanly. In addition, the sinews which connect the meat to the bone are removed by the cutter at the same time as the bone.

The speed of rotation of the cutter 124 and its features (number and shape of teeth, cutting angle etc.) are determined so that the removal of the bone is done correctly and the membrane which connects the ribs is not damaged during this operation.

A variant embodiment shown in FIG. 4 differs from the embodiment of FIGS. 1 to 3, only by the fact that the relative movement of the two units for cutting the spinal column and for cutting the ribs, instead of producing a displacement of the unit for cutting the spinal column on a fixed bed plate carrying the other unit, is obtained by displacement of the unit 3 for cutting the ribs on the bed plate 1 while the unit 2 for cutting the spinal column is fixed permanently on the said bed plate. The same reference numerals have been used to designate the corresponding parts. The movable unit 3 is provided with wheels 181 supported by rails 182 and it is displaced, for example, by means of a fluid pressure linear actuator 184, the cylinder 185 of which is fixed to to the bed plate 1 while its piston rod 186 is connected to the frame of the unit 3.

The operation of this machine shown in FIG. 4 is the same as that of the machine shown in FIGS. 1 to 3.

In another embodiment, the displacement of the unit 3 on its rails can of course be effected by means other than by fluid pressure linear actuator 184, by means of any suitable conventional transmission.

Another embodiment shown in FIGS. 5 to 7 differs essentially from the embodiments described above by the fact that the unit 2, for cutting the spinal column, and the unit 3, for cutting the ribs, are both fixed permanently on the bed plate 1. The transfer of the quarter 5 from the one unit to the other is made solely by means of the pincers or grab 201, to which is inparted not only a rocking movement but also a horizontal sliding movement on the top of the frame of the unit 3 for cutting the ribs.

The unit 2, for cutting the spinal column, is slightly more simple than that shown in FIG. 4, as it does not have the crosspiece 55 for supporting the ribs, nor the corresponding upper clamping traverse 62. The different control members for these two crosspieces, therefore are also dispensed with. All the other members remain the same as in FIGS. 1 to 4 and, in FIG. 5, the same reference numerals have been retained as in the preceding figures to designate the corresponding parts.

The unit 3 for cutting the ribs is the same as in the machine shown in FIG. 1, but the structure of the pincer or grab is different.

The grab 201 comprises a jaw, which will be called hereafter "fixed jaw 204," which is integral with a transverse horizontal shaft 164 for supporting the pincer 201, and a movable jaw 205 provided with fluted shoes 206 for clamping the quarter of meat. This movable jaw is mounted to pivot freely on the shaft 164.

While in the embodiment of the preceding figures the shaft 164 for supporting the pincer pivots in the upper part of the frame of the unit 3, in the embodiment of FIGS. 5 to 7, the shaft 164 rotates in a small frame 211 composed of two shoes 211A, 211B which are slidably mounted in respective horizontal longitudinal slideways 212, 213 secured to the upper part of the frame 121, 122 of the unit 3. The frame 211 for supporting the pincers 201 can be caused to advance or move back by means of two fluid pressure linear actuators 216, 217, the cylinders 218, 219, of which are secured to the slideways 212, 213, respectively, while their piston rods are respectively secured to the shoes 211A, 211B.

The opening and closing movements of the pincer 201 are caused by two fluid pressure linear actuators 225, 226, the cylinders 227, 228 of which are articulated on a crosspiece 229 connected to a rearward extension of the fixed jaw 204, while their piston rods 231, 232 are articulated on arms 233, 234 fixed to or integral with the movable jaw 205.

The shaft 164 can be caused to oscillate, so as to rock the pincer 201, by means of any suitable control system, for example, by means of an electric brake motor 241 (see FIG. 7) fixed on shoe 211B of the frame 211 of the pincer and connected to the shaft 164 by a transmission comprising, for example, a speed reducer 242, and a pinion 243 in engagement with a toothed wheel 244 secured to shaft 164.

This machine operates as follows:

The pincer 201 being open, that is, its movable jaw 205 occupying the position indicated in broken lines at 205A in FIG. 5, and the device which comprises the clamping shoes 34 being raised, a meat quarter 5 is placed on the table 32 with the ribs downwardly and the spinal column 4 located along the rear edge of the table slightly outside the latter as shown, above the cutter 11. The meat quarter 5 is clamped by lowering the clamping shoes 34 onto it, and closing the pincer 201 which supports the overhanging part of the quarter while the cutter 11 removes the spinal column 4. For this cutting operation the pincer 201 had been previously brought into the advanced position as shown in FIG. 5 by means of the fluid pressure linear actuators 216, 217. In other words, in this embodiment, the jaws of the pincers 201 clamp the quarter at a certain distance from the edge of the latter which comprises the ends of ribs 7 so that the quarter is conveniently held during the cutting operation.

This cutting operation for the spinal column having been completed under the same conditions as described previously regarding the other embodiments of the machine, the quarter of meat 5 is released from the unit 2 for cutting the spinal column by raising the clamping shoes 34 by the jacks 48. The pincer 201 is caused to move back over the unit 3 by shortening the jacks 216, 217 and the pincer is caused to rock by a pivoting movement in the direction of arrow $f$ (FIG. 5) by means of the electric motor 241, until the meat still firmly clamped between the jaws of the pincer is brought, with the ribs at the top, to the cutter 124 for cutting out the ribs as indicated at 5A in FIG. 5. As in the embodiments previously described, the pressure cylinder 141, previously brought into the lower position 141A, is now raised into the upper position 141 so as to apply the ribs 7 against the positioning cylinders 131, 132.

The pincer 201 is opened so as to permit the quarter 5A to be driven between the feeding and positioning rollers 131, 132 and the pressure roller 141 so as to be fed to the cutter 124 which ensures, as the quarter progressively advances, complete cutting of the ribs under the same conditions as described above. When the ends of the ribs have left the jaws of pincer 201, the pincer can be returned to the advanced position and caused to rock in the direction opposite to arrow $f$ so as to bring it into the upper start position ready to receive an unboned quarter of meat.

The invention is of course not limited to the embodiments described and shown which have been given by way of examples only, and numerous modifications can be made thereto according to the applications envisaged within the scope of the invention.

I claim:

1. A machine for boning forequarters of meat, said machine comprising a first unit for removal of the spinal column of the quarter, said first unit having means for supporting a quarter of meat and a first rotary cutter for removing the spinal column, said machine also comprising a second unit with a second rotary cutter for removing ribs from a quarter of meat and means for guiding and advancing the quarter to said second cutter, and conveying means for transferring the quarter from said first unit to said second unit.

2. A machine according to claim 1, wherein said supporting means comprises a table in said first unit for supporting the quarter arranged with the ribs facing downwardly and the spinal column overhanging a rear edge of said table, said first unit including clamping means for clamping the quarter on said table, and means for supporting the ribs beyond said rear edge of said table, said first rotary cutter being cylindrical and adjustable in height and adapted to move along said rear edge of said table.

3. A machine according to claim 1 wherein said second unit includes at least one rotatable feed cylinder for guiding and bringing the quarter under said second rotary cutter with the ribs on top, and a rotatable supporting cylinder which is adjustable in height for supporting the quarter against said feed cylinder.

4. A machine according to claim 3, said conveying means comprising a support carrying a wide rocking pincer to seize the quarter on said first unit to transfer it to said second rotary cutter of said second unit.

5. A machine according to claim 4, said support of said pincer being secured to one of said units.

6. A machine according to claim 5 wherein said support of said pincer is secured to said second unit.

7. A machine according to claim 5 wherein one of said first and second units is movable with respect to the other of said first and second units to approach or move away from said other unit.

8. A machine according to claim 6 wherein said support of said pincer is mounted to be longitudinally slidable in a horizontal direction on top of said second unit.

References Cited

UNITED STATES PATENTS

| | | | |
|---|---|---|---|
| 3,177,520 | 4/1965 | Vogt et al. | 17—1 |
| 3,177,521 | 4/1965 | Vogt et al. | 17—1 |
| 3,268,947 | 8/1966 | Aubert | 17—1(.5) |

FOREIGN PATENTS

| | | | |
|---|---|---|---|
| 1,330,600 | 5/1963 | France | 17—1.5 |
| 130,361 | 10/1960 | U.S.S.R. | 17—1.5 |

LUCIE H. LAUDENSLAGER, Primary Examiner